United States Patent [19]
Smith, III et al.

[11] Patent Number: 5,469,191
[45] Date of Patent: Nov. 21, 1995

[54] CURSOR CONTROL SYSTEM

[76] Inventors: Jay Smith, III, 348 Bentel Ave., Los Angeles, Calif. 90049; Jeffrey W. Fort, 4825 San Gordiano Ave., #A, Santa Barbara, Calif. 93111

[21] Appl. No.: 983,117

[22] Filed: Nov. 30, 1992

Related U.S. Application Data

[63] Continuation of Ser. No. 639,592, Jan. 9, 1991, abandoned.

[51] Int. Cl.$^6$ ............................................ G09G 3/02
[52] U.S. Cl. ........................ 345/157; 345/159; 345/160
[58] Field of Search ........................................ 345/157–160

[56] References Cited

U.S. PATENT DOCUMENTS

| | | | |
|---|---|---|---|
| 4,464,652 | 8/1984 | Lapson et al. | 340/716 X |
| 4,739,317 | 4/1988 | Berry et al. | 340/706 X |
| 4,764,763 | 8/1988 | Wickstead et al. | 340/709 |
| 4,870,389 | 9/1989 | Ishiwata et al. | 340/709 |
| 4,887,230 | 12/1989 | Noguchi et al. | 340/709 X |
| 5,012,230 | 4/1991 | Yasuda | 340/709 X |
| 5,012,231 | 4/1991 | Felsenstein | 340/709 |
| 5,146,212 | 9/1992 | Venolig | 340/709 |
| 5,162,781 | 11/1992 | Cambridge | 340/709 X |

*Primary Examiner*—Ulysses W. Don
*Attorney, Agent, or Firm*—Price, Gess & Ubell

[57] ABSTRACT

A cursor control system is provided whereby a discrete-direction input device, such as a joystick, may be used to accurately move a cursor in both straight and curved lines. The cursor control system may be implemented in software and is ideal for with an electronic drawing application having only a rudimentary joystick-like control and various user buttons. A cursor capable of indicating the direction of movement, such as an arrow, is provided and may be aimed with the joystick. During drawing or movement, depression of the joystick causes the arrow to rotate towards the selected direction at a fixed angular rate such that the arrow travels in a smooth arc. The control system may be arranged so that the rotation of the arrow stops when it has reached the selected direction or so that the arrow continues to rotate even after it has reached the selected direction. The former control method may be used for moving and the latter control method for drawing. A control may be provided to vary the forward speed of the arrow to thereby vary the radius of the arc.

15 Claims, 8 Drawing Sheets

5,469,191

CURSOR CONTROL SYSTEM

This is a continuation of application Ser. No. 07/639,592 filed on Jan. 9, 1991, for a Cursor Control System now abandoned.

BACKGROUND OF THE INVENTION

1. Field of the Invention

The present invention relates generally to video devices and, more particularly, to a cursor movement system for use in providing both straight and smooth curve cursor movement in a video application having only a simple discrete-direction control.

2. Description of Related Art

There are numerous devices and software interfaces for positioning a cursor displayed on a video screen. The known cursor positioning devices range from a plurality of separate buttons, a joystick, a mouse, or a graphics tablet and pen. The latter two devices are preferred in a drawing application because the user can easily produce smooth curves with corresponding movement of the mouse or graphics pen.

However, with separate buttons or a joystick (essentially separate buttons operable with a single member), it is difficult for a user to accurately guide a video cursor through a curved path. The joystick-type of input device might best be referred to as a "discrete-direction" input device, since the user is generally limited to selecting one of a limited number of discrete directions. As has been experienced by many children attempting to draw a curve on their "Etch-A-Sketch," the best that can be hoped for is a haphazard series of stair-stepped lines.

Some years ago, Nintendo of America introduced a computer-based game system that operates with an ordinary television screen. Because Nintendo games are only provided with a pair of "discrete-direction" controllers, it is difficult to implement effective drawing programs.

SUMMARY OF THE INVENTION

Based on the above background, it is an object of the present invention to provide a cursor movement system that is capable of achieving both straight and smooth curved lines when only a discrete-direction input means is available.

It is a further object of the present invention to provide a cursor movement system having a direction-seeking mode where the cursor locks onto a selected direction, and a continuous rotation mode where the cursor rotates towards and even beyond the selected direction; and It is a further object of the present invention to provide a drawing system which implements the cursor control of the present invention.

In accordance with the above objects, the present invention is comprised of a cursor movement system capable of moving a cursor in straight lines and in smooth curves comprising: a display; a cursor movable on said display, said cursor including a direction indicating means for indicating a forward direction of said cursor; a move switch; movement control means for moving said cursor forward at a predetermined speed of forward movement in response to an activation of said move switch; direction input means having an operable member for providing a discrete directional signal in response to an activation of said operable member; and rotational control means for rotating said cursor at a predetermined speed of rotation in response to the discrete directional signal, said cursor rotating towards the direction indicated by the discrete directional signal, whereby said move switch and said operable member may be simultaneously activated to move the cursor forward in a smooth curve of a predetermined radius.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a cursor control system for use with a discrete-direction input device.

Figure 1:
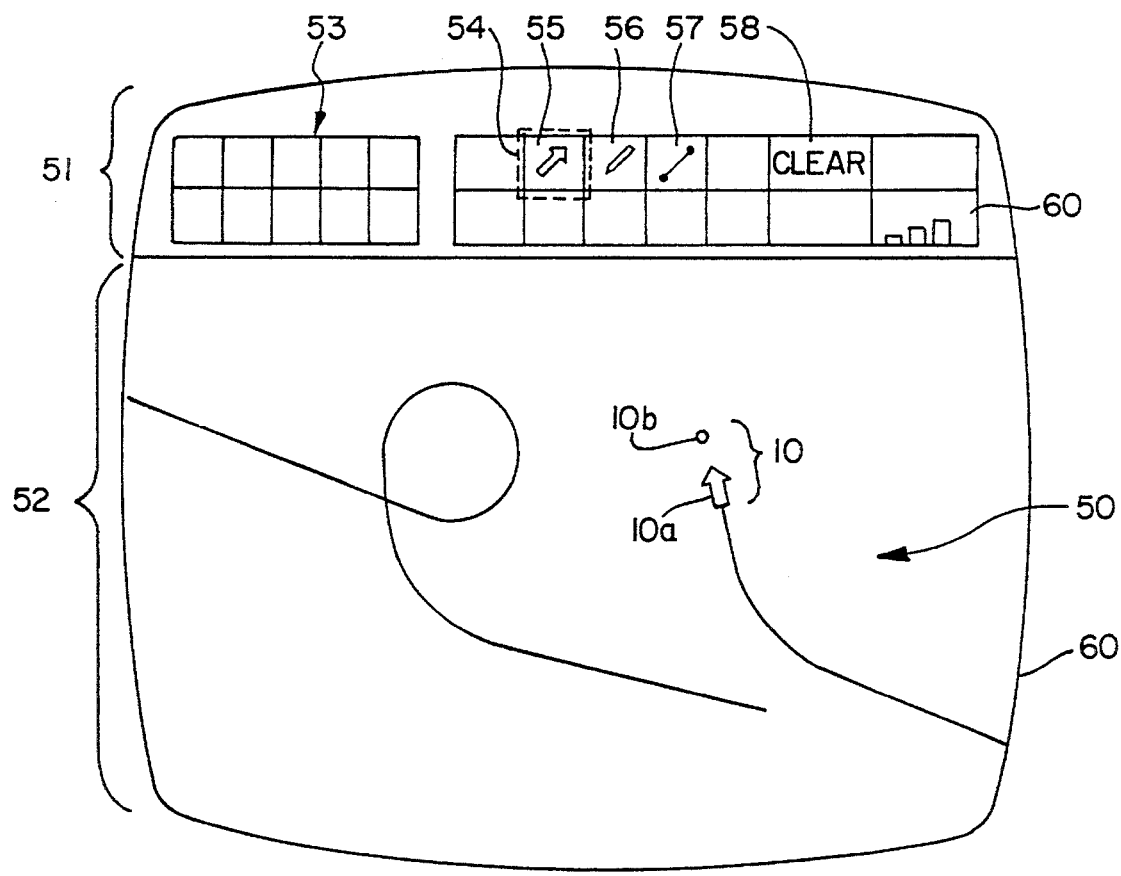
FIG. 1 depicts a video display screen of a drawing or paint program employing the cursor control system of the present invention.

FIG. 1 depicts a video display 60 on which a sample screen of a drawing application 50 is displayed. As will become clear, the present invention is adaptable to many applications and environments in which a cursor is used. For this reason, the drawing application 50 described herein should only be considered as examplary of the herein-described and claimed invention.

Figure 3:
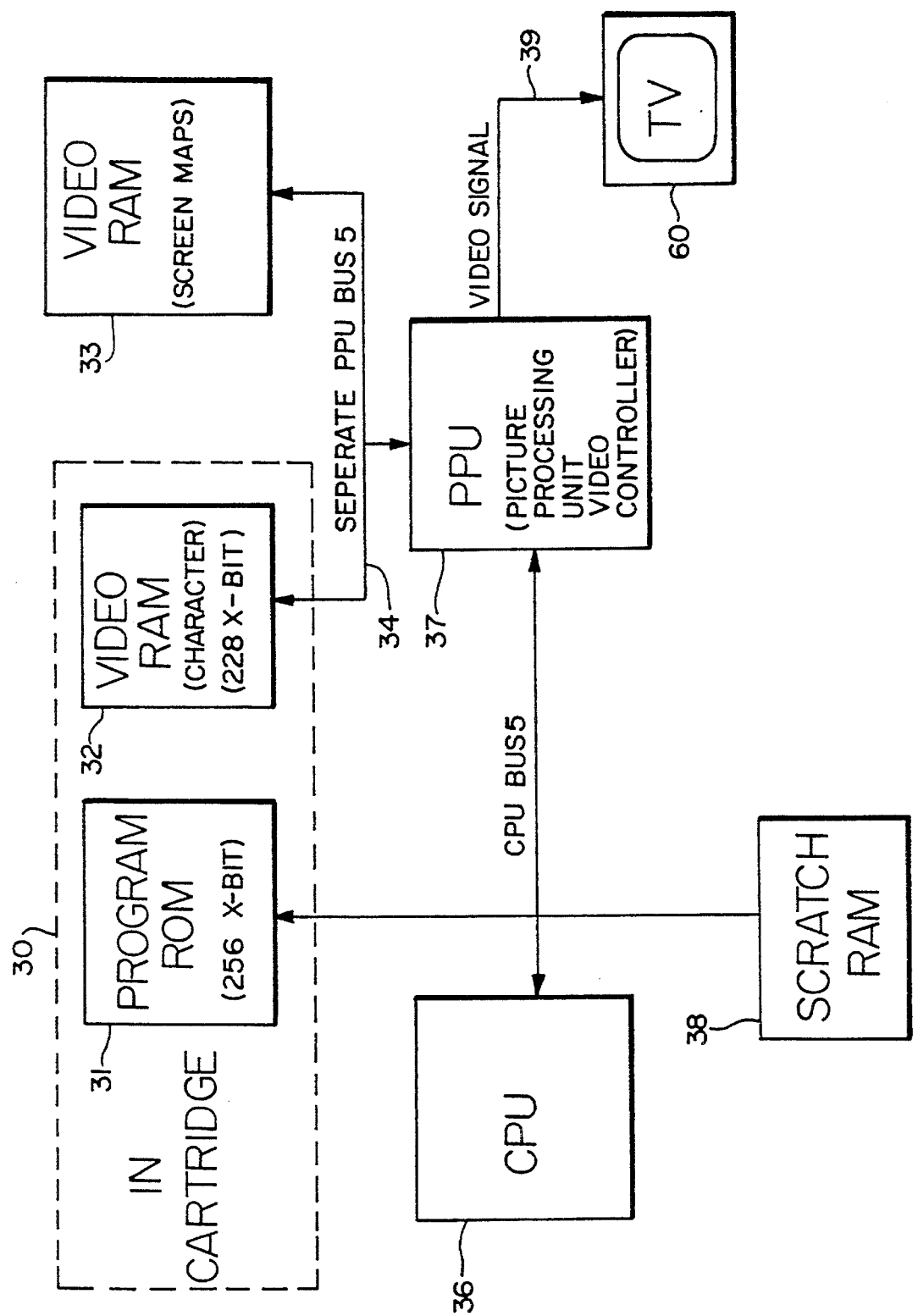
FIG. 3 shows a functional block diagram of Nintendo Corporation's cartridge-based video game in which the present invention is implemented.

A preferred embodiment of the present invention is used in the drawing application 50 of FIG. 1. As shown in FIG. 3, the drawing application 50 is preferably implemented in software stored in a cartridge 30. The cartridge 30, including a program ROM 31 and a video RAM 32, forms a removable part of the popular electronic game system called a Nintendo Entertainment System (NES) and manufactured by or under the direction of Nintendo of America. The detailed operation of the NES system is not germane to the present invention such that a correspondingly detailed description will be omitted. However, as depicted in FIG. 3, the NES system includes a CPU 36 which communicates over a bus 35 with the program ROM 31, as well as with a scratch RAM 38 and a picture processing unit (PPU) 37. The PPU 37 communicates over a separate bus 34 with a screen map video RAM 33 and the cartridge video RAM 32. The cartridge video RAM 32 provides special characters to the screen map video RAM 33, which characters are then displayed on the video display 60 via a video signal 39.

Referring back to the drawing application 50 of FIG. 1, it can be seen that the screen is divided into a menu area 51 and a drawing area 52. The menu area 51 may be subdivided into any desired number of boxes corresponding to selectable functions or "drawing tools." the desired function or tool may be selected by positioning a selection cursor 54 around the corresponding box. The left group of boxes in area 53 correspond to different selectable colors, whereas the right group of boxes correspond to various tools and drawing functions. Since it is unnecessary to describe all possible implementations to understand the present invention, only a limited number of tools and functions are shown. A pencil tool 56 may be used to draw straight lines along one of a finite number of selectable directions, and a line tool 57 may be used to draw straight lines at any angle. A clear function 58 is provided for clearing the drawing area 52. The boxes pertinent to the present invention are an arrow tool select box 55 and a speedometer display 60.

Figure 2:
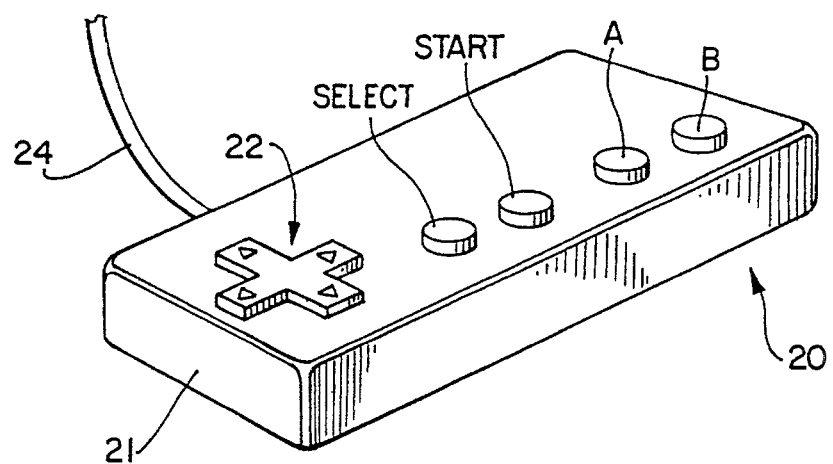
FIG. 2 shows an ordinary discrete-direction input device used in the preferred embodiment of the present invention.

The NES system of FIG. 3 is typically provided with a pair of controllers like the controller 20 shown in FIG. 2. The controller 20 includes a housing 21 that supports a discrete-direction control pad 22, a SELECT button, a START button, an "A" button, and a "B" button. The user's selections are transmitted to the CPU 36 of FIG. 3 via cable 24 (connection not shown).

Based on the background discussion, it is readily apparent that it would be difficult to use the controller 20 to guide a cursor along a smoothly curved path like that shown in the drawing area 52 of FIG. 1. The present invention overcomes the inherent shortcomings of the controller 20 with a novel arrow tool 10a, 10b and related control system.

In a preferred mode, a user may select the arrow tool select box 55 by first pressing the SELECT button to activate the menu area 51, and then using the direction control pad 22 to highlight the arrow tool select box 55 with selection cursor 54. Upon pressing the SELECT button a second time, the drawing area 52 becomes active with a cursor 10 displayed thereon. The preferred cursor 10 is comprised of an arrow 10a and a target 10b to emphasize the direction of the cursor 10.

Figure 4:
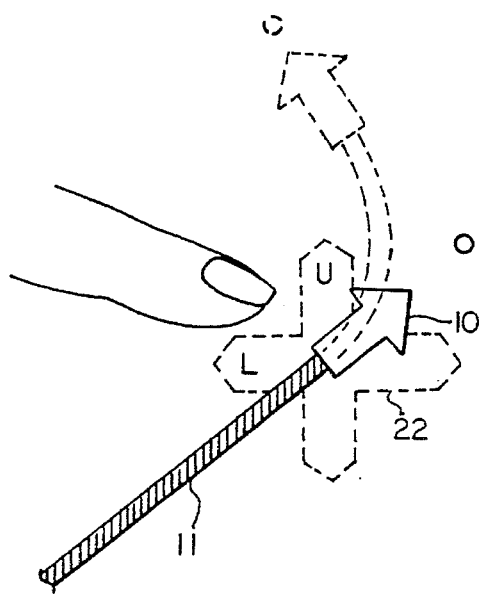
FIGS. 4 and 5 show the functional operation of the cursor control pad of FIG. 2, an outline of the cursor control pad being overlaid with moving arrow tool 10.
Figure 5:
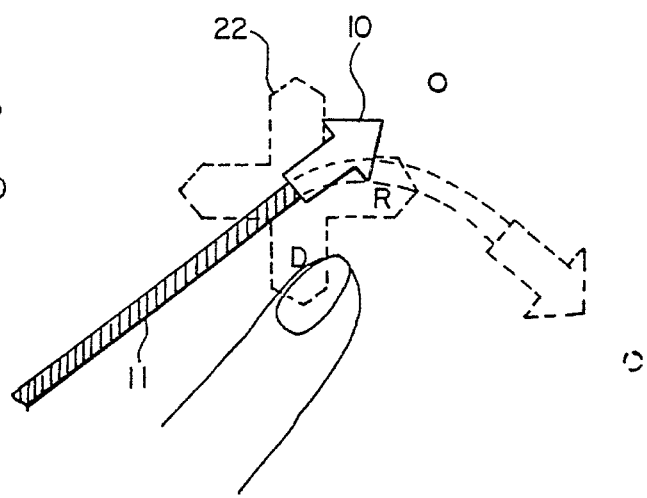

The operational relationship between the direction control pad 22 and the arrow tool 10a, 10b is perhaps best shown in FIGS. 4 and 5. In FIG. 4, the arrow tool 10a, 10b is advancing forward while drawing line 11. If the operator presses the direction control pad 22 in either the Up or the Left direction, then the arrow tool 10a, 10b will continue forward while rotating smoothly left during the entire time the control pad is depressed. FIG. 5 demonstrates that the arrow tool 10 will proceed in the opposite direction if the operator depresses the direction control pad 22 in either the Down or the Right direction for a period of time.

In general, the arrow tool 10 turns towards the direction pressed on the direction control pad 22. However, note that the arrow tool 10 will continue turning even beyond or through that direction until the control pad is released. Hence, as shown in FIG. 5, the user has prepared the direction control pad 22 in the Right direction such that the arrow tool 10 is turning to the right and, if the operator holds the control pad down for a sufficient period of time, the arrow tool 10 will turn beyond or through the Right direction. In effect, the arrow tool 10 will inscribe a complete circle, one or more times, if the operator continues to depress the direction control pad 22 in a particular direction.

Figure 6:
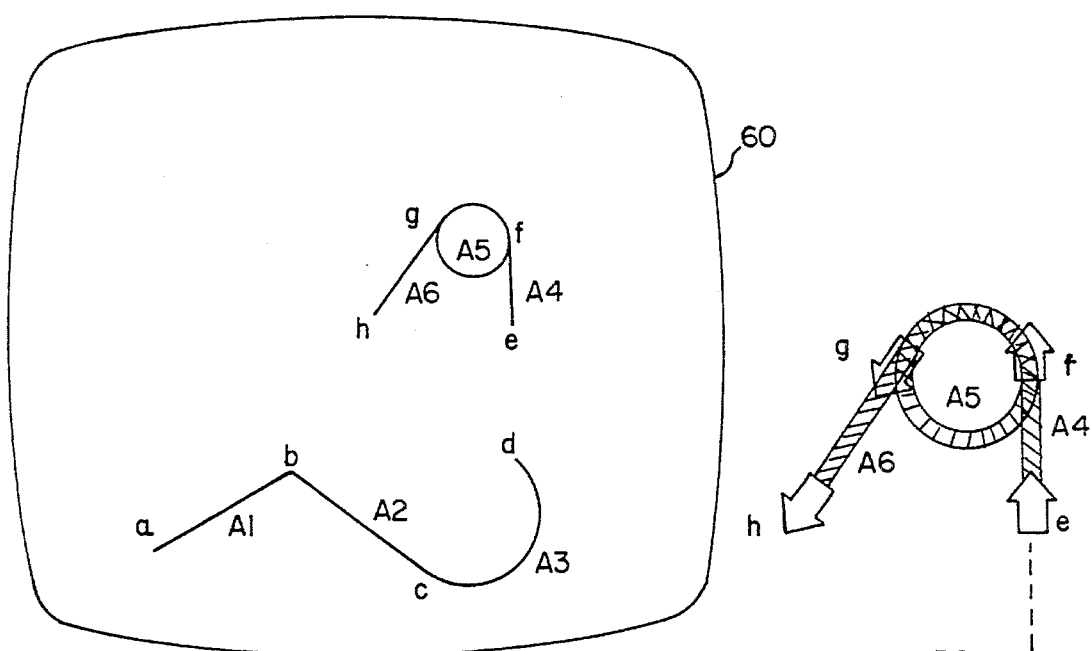
FIGS. 6 and 7 illustrate an examplary drawing comprised of straight and curved line segments, as well as the drawing button "A" and the move button "B"
Figure 7:
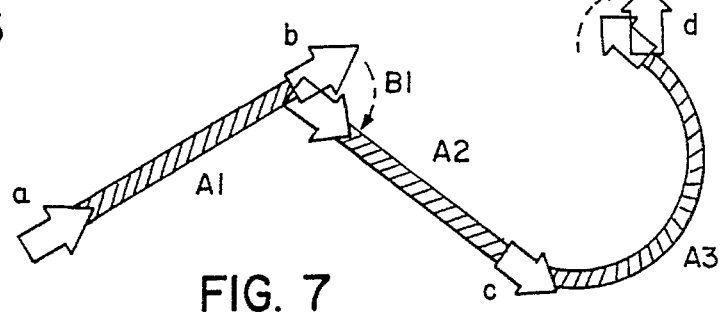

FIGS. 6 and 7 are provided to serve as a description of the full operational relationship between the controller 20 and the arrow tool 10a. A video display 60 is shown having an exemplary line pattern of straight and curved line segments A1 to A6. The construction of the line pattern shown in FIG. 6 will now be described with reference to FIG. 7. It is assumed that the arrow tool 10a is initially at position A and is pointing in the direction shown in FIG. 7. If the operator depresses button "A" for a particular period of time, the arrow tool 10a will advance forward while drawing line segment A1. The operator stops formation of line segment A1 by releasing button "A." Next, in preparation to form line segment A2, the user repositions the arrow tool 10a by pressing, the direction control pad 22 in the Down direction to bring the arrow tool through arc B1.

Note that in the preferred embodiment, the arrow tool 10a is in a "direction-seeking" mode when merely being moved with button "B." In the direction-seeking mode, the arrow tool 10a is rotated or turned until it attains the selected direction, and then stopped. Thus, arc B1 must have been inscribed by depressing the direction control pad 22 in the Down direction, for if the Right direction had been selected, the arrow tool 10a would have stopped moving midway. With the arrow tool 10a now in the desired direction, line segment A2 is drawn by depression of button "A" until the arrow tool 10 advances to position C.

The arrow tool 10a is in "continuous rotation" mode when a line is being drawn with button "A." As the arrow tool 10a passes through position C, the user draws curve A3 by continuing to hold button "A" while simultaneously pressing the direction control pad 22 in either the Up or the Right direction. The button "A" and the direction control pad 22 are both released at position D. The arrow tool 10a is now repositioned in the Up direction by depressing the direction control pad 22 in the Up direction until the arrow-tool 10 locks in direction-seeking mode. Once properly positioned, the operator can advance the arrow tool 10a to position E without drawing a line by depressing button "B," thereby advancing the arrow tool 10a through path B3. At position E, the operator depresses button "A" in order to begin drawing line segment A4 to position F. In order to draw curve A5 having a smaller radius than curve A3, the operator reduces the speed of arrow tool 10a as described further herein. By first holding the direction control pad 22 in the Left direction and then pressing button "A," the circle A5 may be inscribed as the arrow tool 10a turns through the Left direction. As suggested by FIG. 7, the arrow tool 10 may be controlled to travel over the circular path A5 more than once until it arrives at position G. The operator inscribes straight line segment A6 by simply releasing the direction control pad 22 while continuing to hold the button "A" until the arrow tool 10 has arrived at position H.

The operation of the present invention is based on the geometrical relationship between rotation and speed. If the cursor is advanced forward a fixed distance per unit of time (speed), and is rotated a fixed number of degrees per unit of time, then the cursor will inscribe a smooth curve or circle. The radius of the curve or circle can be varied by changing either the forward speed, the rotational speed, or both. In the preferred embodiment of the present invention, the rotational speed is fixed at 120 degrees per second (2 degrees per 1/60 of a second screen frame), and the forward speed of the cursor is varied. The user may vary the cursor speed by repetitively depressing the START button, the current speed being displayed on the video display at box 60.

Figure 12:
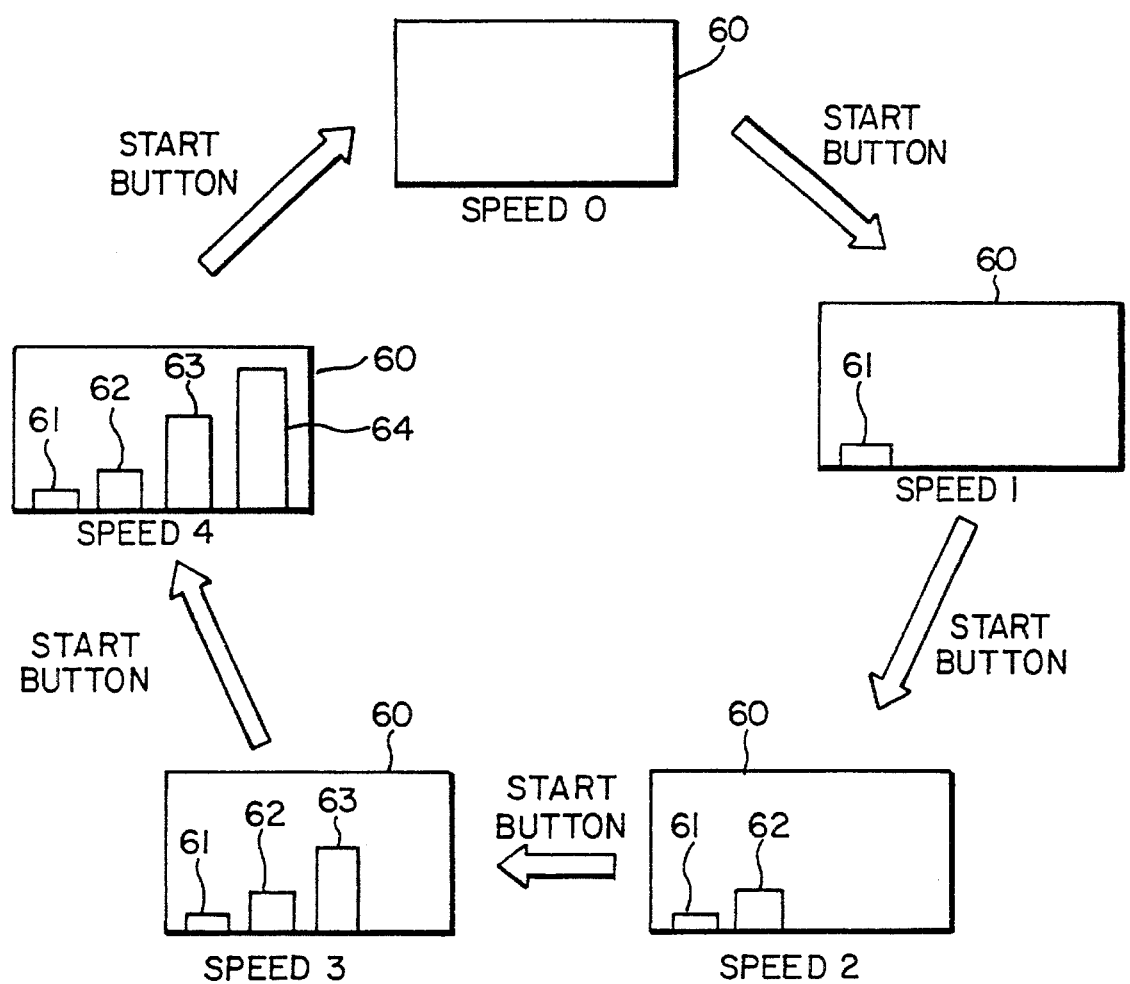
FIG. 12 shows the cyclical relationship between the selectable speeds, the START button of box 60 on the video display.

Box 60 of FIG. 1 represents a speedometer-like display for representing the currently-selected speed of the arrow tool 10*a*, 10*b*. In a preferred embodiment, five speeds are provided, and the START button of the controller 20 is used to cycle through the five speeds. As shown in FIG. 12, the speedometer display 60 is controlled to be blank or to display one to four graphic bars 61 to 64 in order to represent any one of the five speeds. Depression of the START button will cycle through the speeds while simultaneously updating speedometer display 60. Other methods of controlling and displaying cursor speed are, of course, possible.

Figure 8:
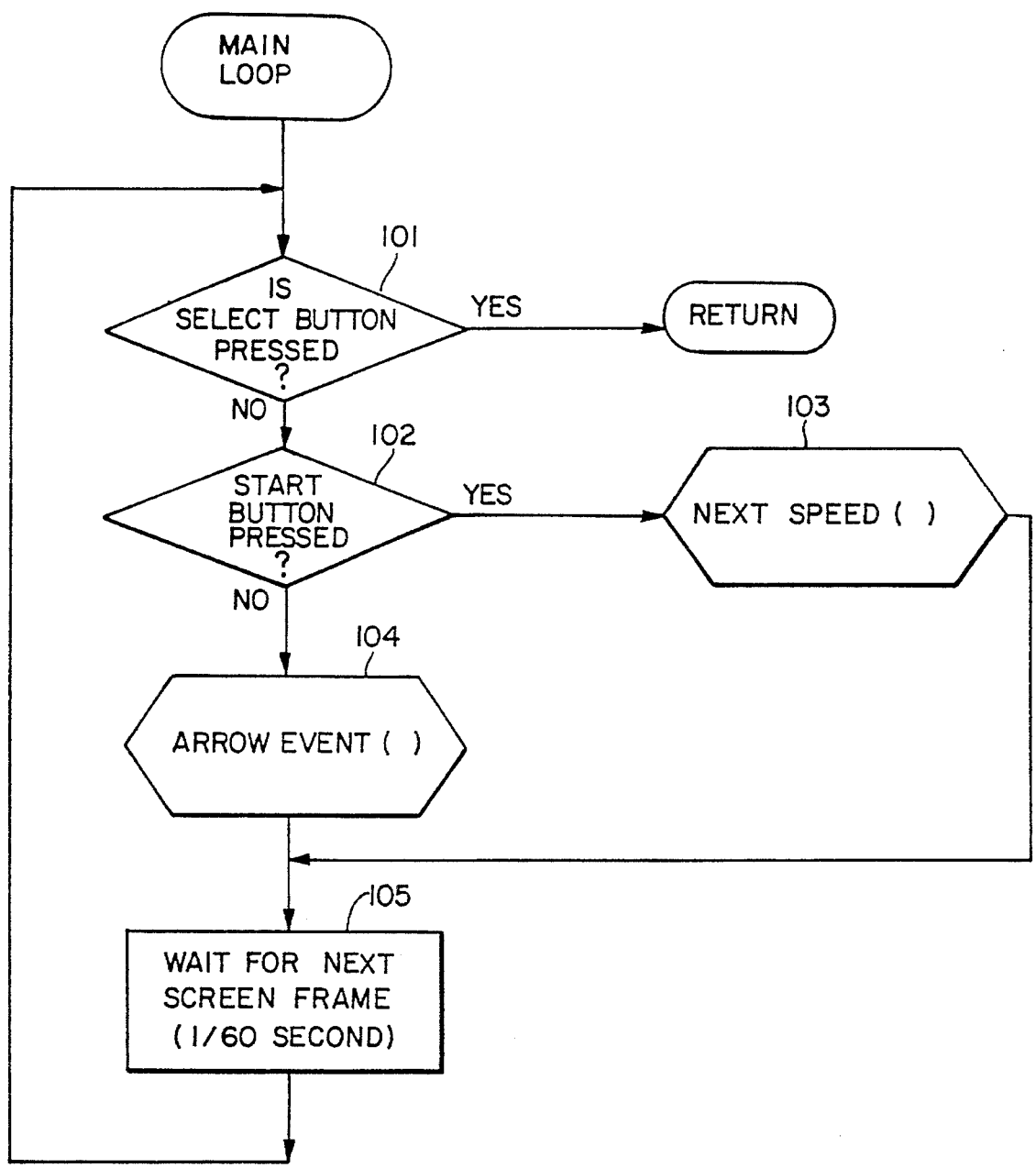
FIGS. 8 to 11 illustrate flow charts of the preferred software implementation of the present invention.

As the present invention is generally implemented with software, a currently preferred embodiment of the control logic is set forth in FIGS. 8 to 11. FIG. 8 depicts a main loop of the arrow tool control, which main loop is to be understood as forming a part of the overall drawing application 50. In general, the main loop continually checks whether or not the SELECT button, the START button, or the direction control pad 22 (ArrowEvent) have been pressed. At step 101, if the SELECT button has been pressed, flow is returned to another portion of the drawing application, in order to activate menu area 51. If the SELECT button has not been pressed at step 101, flow proceeds to step 102 where, if the START button has been pressed, the speed of the arrow tool 10*a* is updated at step 103 (see FIG. 12). If neither the SELECT button nor the START button have been pressed during this cycle, it is determined whether or not an ArrowEvent has occurred during this cycle at step 104.

Figure 9:
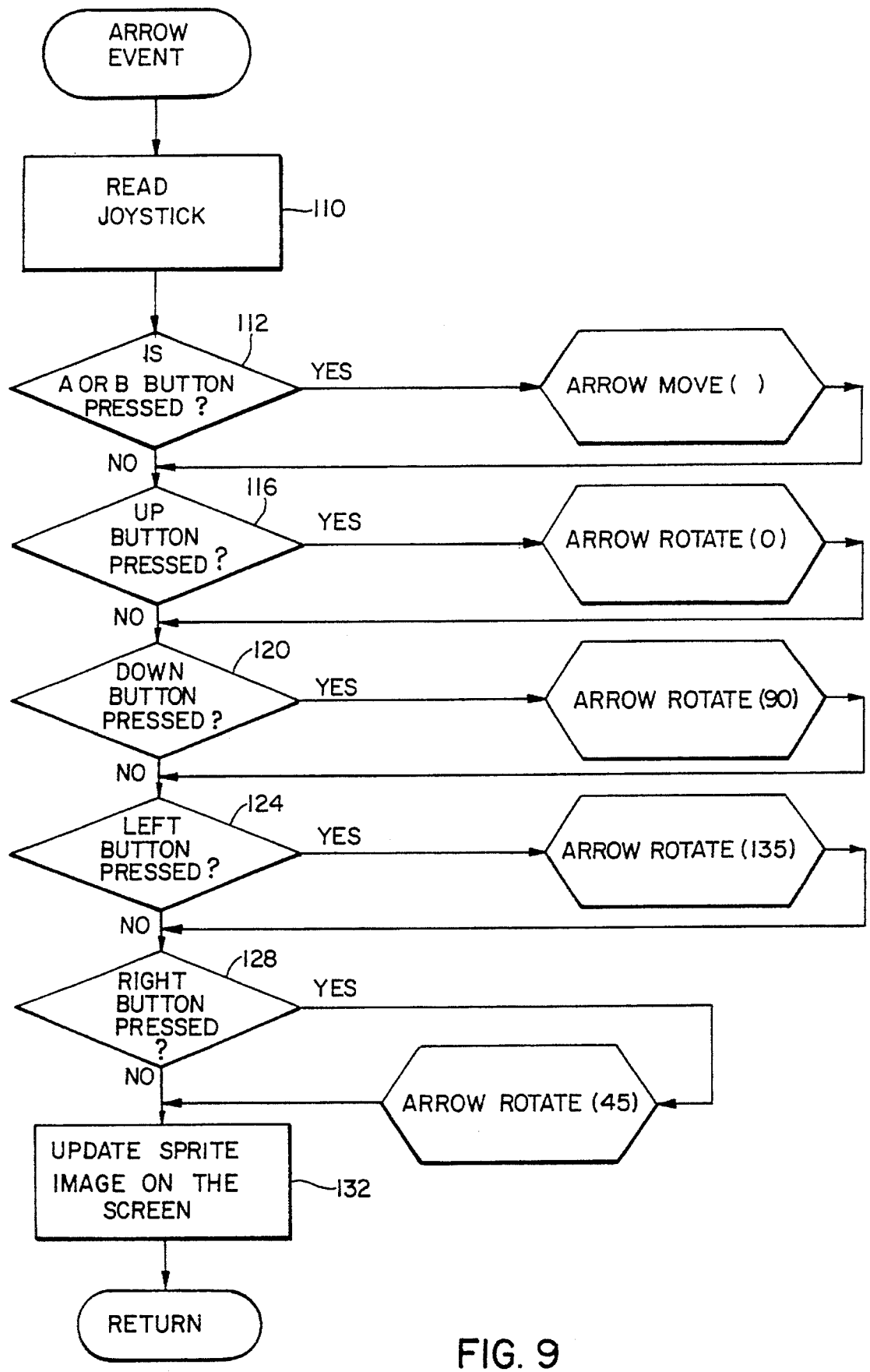

The flow of a preferred ArrowEvent subroutine is set forth at FIG. 9. At step 110, the state of the controller 22 is determined. If either the "A" or "B" button was pressed, flow proceeds to an arrow movement subroutine at step 112.

If neither the "A" button nor the "B" button have been pressed, but the direction control pad 22 has been pressed in any direction, then flow proceeds to an ArrowRotate subroutine from one of steps 116, 120, 124, or 128. As shown, when the ArrowRotate subroutine is called, it is passed an initial rotation value (ROT) that is set to 0, 45, 90 or 135, depending on whether the direction control pad 22 has been pressed in the Up direction, the Right direction, the Down direction, or the Left direction, respectively. At step 132, the screen image is refreshed and control is returned to the main loop where, if necessary, a screen frame delay is processed at step 105.

Figure 11:
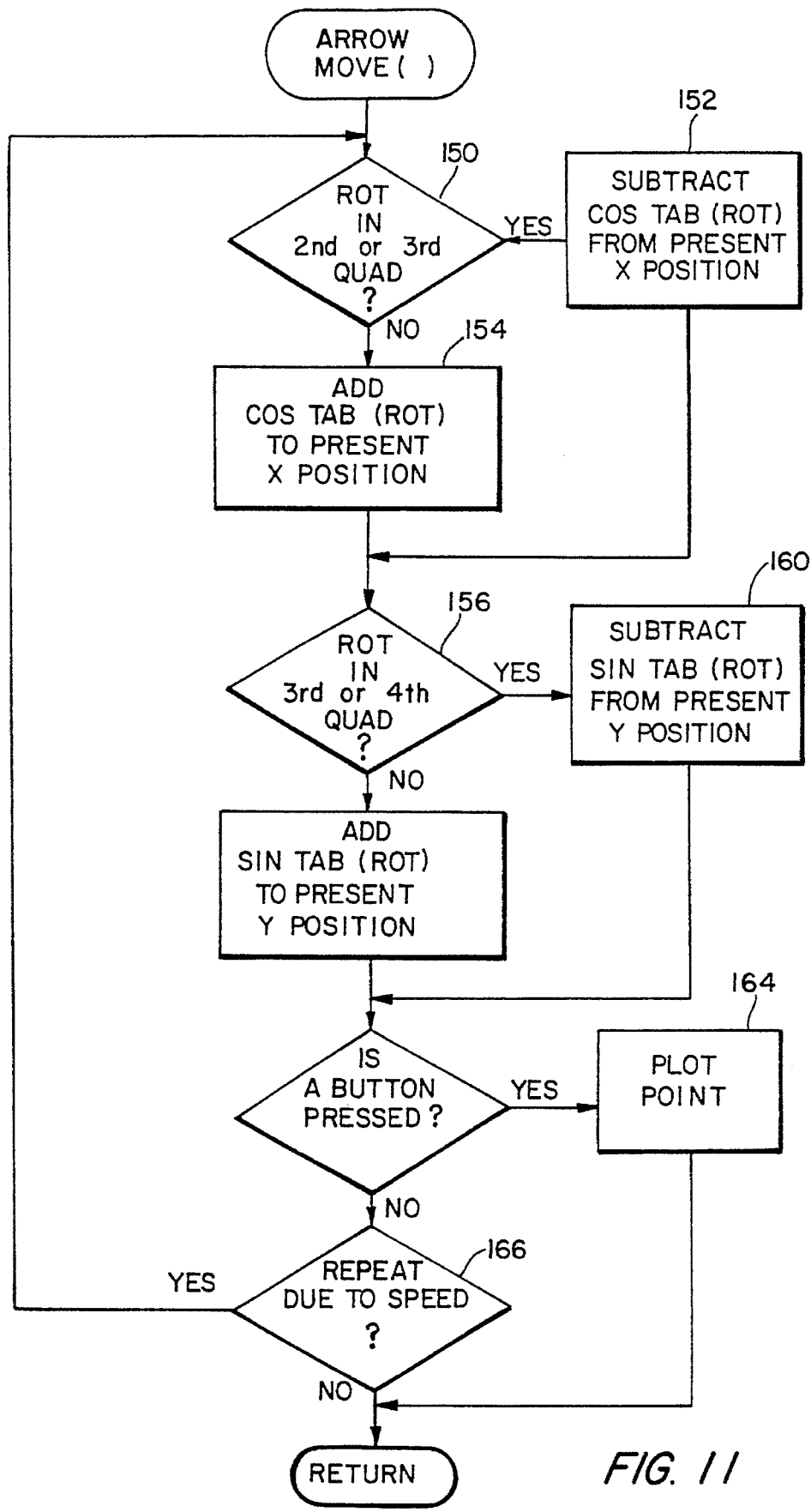

The ArrowRotate subroutine, called with an initial directional parameter (PARAM) will now be described with reference to FIG. 11. At step 140, it is checked whether the current arrow tool direction ROT is equal to the initial parameter provided by the ArrowEvent subroutine. If Yes, flow returns. It can be appreciated that step 140 is implementing a preferred direction-seeking mode of rotation. At step 142, if the current arrow tool direction ROT exceeds the desired direction PARAM passed from the ArrowEvent subroutine, then the current value of ROT is decremented at step 143. If the current direction ROT does not exceed the desired direction PARAM, then the current direction ROT is incremented at step 144. Flow then returns to the calling routine.

Figure 10:
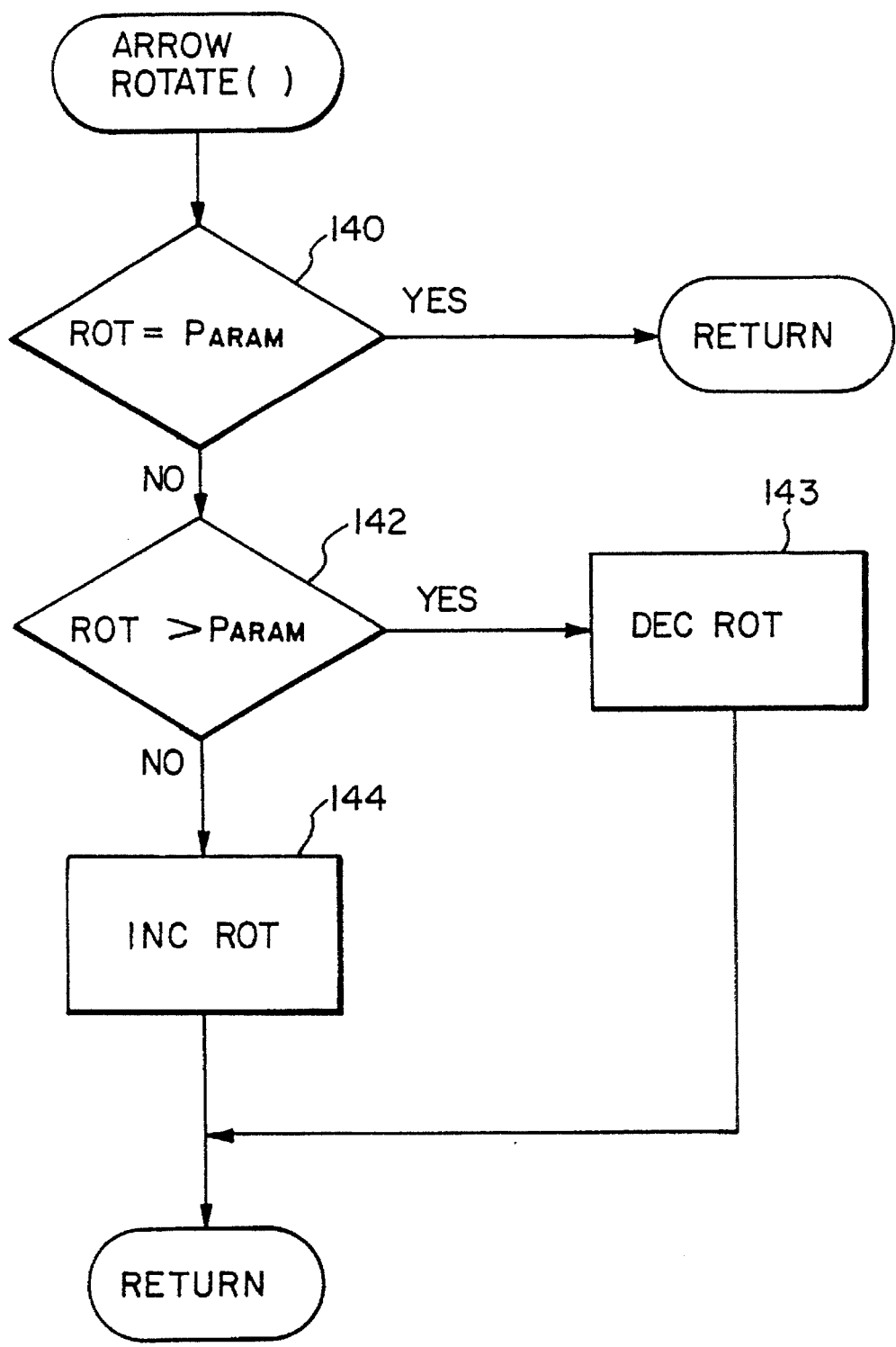

If either the "A" button or the "B" button is pressed at step 112, then the arrow move subroutine of FIG. 10 is called. At step 150, it is determined whether the current arrow tool direction ROT is in either the second or third Cartesian quadrants (i.e., the left half). If it is determined that the current arrow tool direction is pointing into the left half of the Cartesian plane, then the updated X position of the cursor 10 is obtained by subtracting, at step 152, a value from the present X position. The exact value to be subtracted is, of course, a function of the arrow tool direction ROT, and is determined by referencing a table called CosTab with the value ROT. If the arrow tool direction ROT was found to be in the right half of the Cartesian plane at step 150, then the value retrieved from the CosTab table is added to the present X position at step 154. Next, at step 156, it is determined whether the current arrow tool direction ROT is in the third or fourth Cartesian quadrant (i.e., the bottom half). If Yes, an appropriate value is retrieved from a SinTab table and subtracted from the present Y position. On the other hand, if the arrow tool direction ROT is in the first or second quadrants, then a retrieved value is added to the present Y position at step 158. At step 162, it is determined whether the just-made adjustments to the X, Y position of the cursor 10 were accomplished with the "A" button or the "B" button. If accomplished with the "A" button, then a point is plotted at the present cursor position at step 164. At standard speed, flow is returned to the calling program at step 166. However, if the selected speed has been increased, step 166 serves to repeat the arrow move subroutine one or more times during this cycle to lengthen the distance moved or the line drawn.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A cursor movement system capable of moving a cursor in straight lines and in smooth curves comprising:

a display;

a cursor movable on said display, said cursor being rotatable on its own axis for selecting a forward direction of said cursor, and including a rotatable direction indicating means for indicating the forward direction;

a move switch which may be activated for moving said cursor without drawing a line;

movement control means for moving said cursor in the forward direction at a selected speed of forward movement in response to an activation of said move switch;

an operable member for providing one of a finite plurality of discrete directional signals in response to an activation of said operable member; and rotational control means for rotating the rotatable direction indicating means of said cursor at a predetermined speed of rotation in response to the discrete directional signal, the rotatable direction indicating means of said cursor rotating towards the direction indicated by the discrete directional signal, whereby said move switch and said operable member may be simultaneously activated to move the cursor forward in a smooth curve of a predetermined radius.

2. The cursor movement system of claim 1 further comprising:

means for varying said predetermined radius by varying the selected speed of rotation of said rotational control means.

3. The cursor movement system of claim 1 further comprising:

means for varying said predetermined radius by varying the selected speed of said movement control means.

4. The cursor movement system of claim 3 wherein the means for varying the selected speed of said movement control means is comprised of an operable member which may be operated to select one of a finite number of discrete speeds.

5. The cursor movement system of claim 4 further comprising a speedometer means for indicating the selected speed.

6. The cursor movement system of claim 5 wherein the speedometer means is comprised of a bar chart display.

7. The cursor movement system of claim 1 wherein the operable member is comprised of a joystick.

8. The cursor movement system of claim 1 further comprising:

a draw switch which may be activated for moving said cursor while simultaneously drawing a line; and drawing control means for moving said cursor forward at a selected speed of forward movement and for drawing a point on said display in response to an activation of said draw switch, whereby said draw switch and the operable member of said direction input means may be simultaneously activated to move the cursor forward while simultaneously drawing a smooth curve of a predetermined radius.

9. The cursor movement system of claim 8 wherein the move switch and the draw switch are each comprised of a momentary contact button.

10. The cursor movement system of claim 8 wherein the rotational control means includes:

a direction seeking means for rotating the rotatable direction indicating means of said cursor towards but only until its direction corresponds to the direction indicated by said directional signal; and a continuous rotation means for rotating the rotatable direction indicating means of said cursor towards and beyond the direction indicated by said directional signal.

11. The cursor movement system of claim 10 wherein:

said direction seeking means is operative when said movement control means and said rotational control means are simultaneously activated whereby the user may easily move the cursor to a desired cartesian position; and said continuous rotation means is operated when said drawing control means and said rotational control means are simultaneously activated whereby full circles may be drawn.

12. A drawing system capable of drawing straight lines and smooth curves comprising:

a display;

a cursor movable on said display, said cursor being rotatable about its own axis for selecting a forward direction of said cursor and including a rotatable direction indicating means for indicating the forward direction;

a draw switch which may be activated for moving said cursor while simultaneously drawing a line;

drawing control means for moving said cursor in the forward direction at a selected speed and for drawing a point on said display, said drawing control means operating in response to an activation of said draw switch;

a move switch which may be activated for moving said cursor without drawing a line;

movement control means for moving said cursor in the forward direction at the selected speed of forward movement, but without drawing a point on said display, said movement control means operating in response to an activation of said move switch;

an operable member for providing one of a finite plurality of discrete directional signals in response to an activation of said operable member;

means for varying the selected speed at which said cursor is moved by said drawing control means and said movement control means; and rotational control means for rotating the rotatable direction indicating means of said cursor at a predetermined speed of rotation in response to the discrete directional signal provided by said operable member, the rotatable direction indicating means of said cursor rotating towards a direction indicated by the discrete directional signal, whereby the operable member and one of said draw switch and said move switch may be simultaneously activated to move the cursor forward in a smooth curve having a radius which is a function of the speed of rotation and the selected speed.

13. The cursor movement system of claim 12 wherein the operable member is comprised of a joystick.

14. The cursor movement system of claim 13 wherein the rotational control means includes:

a direction seeking means for rotating the rotatable direction indicating means of said cursor towards but only until its direction corresponds to the direction indicated by said directional signal;

and a continuous rotation means for rotating the rotatable direction indicating means of said cursor towards and beyond the direction indicated by said directional signal.

15. The cursor movement system of claim 14 wherein:

said direction seeking means is operative when said joystick is activated alone or in conjunction with said move switch whereby the user may easily move the cursor to a desired cartesian position; and said continuous rotation means is operative when said joystick and said draw button are simultaneously activated whereby full circles may be drawn.

\* \* \* \* \*